(12) United States Patent
Taylor et al.

(10) Patent No.: US 8,285,870 B2
(45) Date of Patent: Oct. 9, 2012

(54) SYSTEMS AND METHODS FOR STATISTICAL RESOLUTION OF DOMAIN NAME SERVICE (DNS) REQUESTS

(75) Inventors: Thomas Steven Taylor, Atlanta, GA (US); John Yakemovich, Atlanta, GA (US); Alisson Friedrich, Atlanta, GA (US); Tom Hansen, Bethesda, MD (US); Kiruthika Selvamani, Bethesda, MD (US)

(73) Assignee: EchoStar Technologies L.L.C., Englewood, CO (US)

( * ) Notice: Subject to any disclaimer, the term of this patent is extended or adjusted under 35 U.S.C. 154(b) by 691 days.

(21) Appl. No.: 11/850,522

(22) Filed: Sep. 5, 2007

(65) Prior Publication Data
US 2009/0063704 A1 Mar. 5, 2009

(51) Int. Cl.
G06F 15/173 (2006.01)
(52) U.S. Cl. .................. 709/238; 709/224; 709/244
(58) Field of Classification Search .................. 709/224, 709/238, 244
See application file for complete search history.

(56) References Cited

U.S. PATENT DOCUMENTS

| | | | |
|---|---|---|---|
| 6,185,619 B1 | 2/2001 | Joffe et al. | |
| 6,493,765 B1 * | 12/2002 | Cunningham et al. | 709/245 |
| 6,526,450 B1 * | 2/2003 | Zhang et al. | 709/245 |
| 6,578,066 B1 * | 6/2003 | Logan et al. | 718/105 |
| 6,795,848 B1 | 9/2004 | Border et al. | |
| 6,892,354 B1 * | 5/2005 | Servan-Schreiber et al. | 715/733 |
| 7,020,719 B1 | 3/2006 | Grove et al. | |
| 7,085,817 B1 | 8/2006 | Tock et al. | |
| 7,296,088 B1 * | 11/2007 | Padmanabhan et al. | 709/238 |
| 7,359,395 B2 | 4/2008 | Toporek et al. | |
| 7,389,330 B2 | 6/2008 | Dillon et al. | |
| 7,389,533 B2 | 6/2008 | Bartlett et al. | |
| 7,526,538 B2 | 4/2009 | Wilson | |
| 2003/0112772 A1 * | 6/2003 | Chatterjee et al. | 370/316 |
| 2004/0073707 A1 * | 4/2004 | Dillon | 709/245 |
| 2004/0194111 A1 | 9/2004 | Marcey et al. | |
| 2004/0205149 A1 | 10/2004 | Dillon et al. | |
| 2004/0215823 A1 * | 10/2004 | Kleinfelter et al. | 709/245 |

(Continued)

FOREIGN PATENT DOCUMENTS
WO 2000052594 A2 9/2000

OTHER PUBLICATIONS
USPTO Non-Final Office Action mailed Feb. 3, 2011; U.S. Appl. No. 11/866,130, filed Oct. 2, 2007.

(Continued)

*Primary Examiner* — Mohamed Ibrahim
(74) *Attorney, Agent, or Firm* — Ingrassia Fisher & Lorenz, P.C.

(57) ABSTRACT

Systems and methods are provided for resolving domain name services (DNS) queries for address information about hosts on a network. The queries are posited from remote users across a satellite or other remote link to a network, and are monitored as they pass through a central node logically present between the remote link and the network. A list of statistically significant hosts on the network is maintained and transmitted from the central node to the plurality of remote users across the remote link. By providing the remote nodes with a current list of popular hosts and associated address information, subsequent domain name services queries placed for the statistically significant hosts may be resolved without communicating across the remote link.

23 Claims, 3 Drawing Sheets

U.S. PATENT DOCUMENTS

| | | |
|---|---|---|
| 2005/0044270 A1 | 2/2005 | Grove et al. |
| 2005/0235044 A1 | 10/2005 | Tazuma |
| 2006/0031394 A1 | 2/2006 | Taxuma |
| 2007/0061465 A1 | 3/2007 | Kim et al. |
| 2009/0089441 A1 | 4/2009 | Taylor et al. |

OTHER PUBLICATIONS

China State Intellectual Property Office "First Office Action of China State Intellectual Property Office," issued Mar. 22, 2011; Appln. No. 200810161268.8.

USPTO Non-Final Office Action mailed Aug. 19, 2009; U.S. Appl. No. 11/866,130, filed Oct. 2, 2007.

USPTO Non-Final Office Action mailed Mar. 25, 2010; U.S. Appl. No. 11/866,130, filed Oct. 2, 2007.

USPTO Final Office Action mailed Sep. 10, 2010; U.S. Appl. No. 11/866,130, filed Oct. 2, 2007.

Thomas Steven Taylor et al. "Systems and Methods for Proxy Resolution of Domain Name Service (DNS) Requests," U.S. Appl. No. 11/866,130, filed Oct. 2, 1007.

* cited by examiner

SYSTEMS AND METHODS FOR STATISTICAL RESOLUTION OF DOMAIN NAME SERVICE (DNS) REQUESTS

TECHNICAL FIELD

The present invention generally relates to communications over a digital network, and more particularly relates to systems and methods for resolving domain name services (DNS) queries.

BACKGROUND

Usage of digital communications networks such as the Internet continues to expand at a very rapid rate. One feature of the Internet that has led to its widespread adoption is its convenience in identifying destination hosts on the network. Computers generally address each other using numeric addresses that can be expressed in binary, hexadecimal, decimal or other numeric form. The well-known Internet Protocol (IP), for example, identifies computers communicating on a network by a unique four-byte address. These IP addresses are commonly expressed in human terms as four decimal numbers separated by periods, e.g. "192.0.23.256". These addresses, while useful to computers, are generally very difficult for most humans to remember.

As a result, the domain name services (DNS) system has been developed and widely deployed to map numerical addresses used by computers to names that are more easily remembered by people. If a user wishes to contact a particular host on the Internet (e.g. "www.echostar.com"), for example, the user's computer contacts a DNS server on the network to request the numeric address for that host (e.g. "205.172.147.51"). The user's computer can then use the numeric address to contact the relevant host on the network.

Although the Internet already links billions of users and nodes worldwide, additional communications links are continually designed and deployed into the marketplace. Satellite links, for example, have shown great promise in providing access to communications networks in a convenient wireless manner. Satellites are typically capable of delivering very high data throughput levels across a wide service area without requiring significant infrastructure (e.g. cables or land based routers) to be in place. As a result, there is significant interest in providing data access to the Internet or another network via satellite links.

Satellite communications have a known disadvantage in inherent latency. In the case of geo-synchronously orbiting satellites, for example, the distance for the signal to travel into space and back to earth can be significant, taking half a second or so to complete the round-trip even at the speed of light. As a result of this inherent feature in satellite communications, the user at the remote end of the satellite connection can experience significant delays for certain tasks. A conventional DNS query for an address of a remote host, for example, typically involves transmitting a query to a DNS server across the satellite link (250 ms) and receiving the reply from the DNS server across the link (another 250 ms), thereby creating a delay of a half second or so to complete the query. This delay time can be frustrating to the end user.

It is therefore desirable to create systems and techniques for efficiently resolving domain name services queries across satellite or other links. These and other desirable features and characteristics will become apparent from the subsequent detailed description and the appended claims, taken in conjunction with the accompanying drawings and this background section.

BRIEF SUMMARY

Various embodiments provide systems and methods for resolving domain name services (DNS) queries for address information about hosts on a network. The queries are posited from remote users across a satellite or other remote link to a network, and are monitored as they pass through a central node logically present between the remote link and the network. A list of statistically significant hosts on the network is maintained and transmitted from the central node to the plurality of remote users across the remote link. By providing the remote nodes with a current list of popular hosts and associated address information, subsequent domain name services queries placed for the statistically significant hosts may be locally resolved without communicating across the satellite or other remote link.

Other embodiments relate to systems for resolving domain name services queries posited from a plurality of remote users across a remote link to a network, wherein each query requests address information about a host on the network. The system includes a domain name services module configured to obtain the address information for the hosts identified in the plurality of domain name services requests. A database maintains a list of the statistically significant hosts on the network that are requested in the plurality of domain name services queries, as well as the address information obtained for the statistically significant hosts. An interface module transmits the database of statistically significant hosts to the plurality of remote users across the remote link to thereby allow the remote users to resolve subsequent domain name services requests relating to the statistically significant hosts without traversing the remote link.

Still other embodiments relate to methods of handling a domain name services query for address information about an identified host residing across a remote link to a network. A list of statistically significant hosts on the network is received via the remote link. If the address information about the host is contained in the list of statistically significant hosts, the domain name services query is resolved with the address information contained in the list of statistically significant hosts. Otherwise, the domain name services query can be forwarded across the remote link.

Other embodiments include computer program products and digital storage media having computer-executable instructions stored thereon. Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary communications system;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments present systems, methods, computer program products and other useful features for improving the performance of domain name services (DNS) queries placed across a network link. Generally speaking, clients communicating across a slow link are provided with a listing of current DNS information for a statistically significant group of hosts, such as the hosts that are most popular or otherwise most likely to be queried. This information may be provided at any convenient time, such as when the network link is relatively idle and/or at a time when the client computer is relatively inactive. Using the list of statistically significant DNS information, queries may be quickly resolved locally, without requiring data to travel across a relatively slow network link.

It should be appreciated at the outset that the techniques described below may be particularly beneficial when used over network links known to exhibit high latency, such as satellite links. In practice however, the concepts, techniques and structures described herein may be readily adapted to any type of data communication placed over any type of link, including any sort of hardwired or wireless link used in conjunction with any type of public, private, governmental, telephone and/or other network system. To that end, the concepts proposed herein may be readily modified as appropriate to suit any number of relevant preferences and parameters. In particular, the exemplary data values and other parameters described herein are strictly examples, and are not intended to limit the scope of the inventions in any way. Various alternate but equivalent embodiments may therefore be created, with any number of parameter values or factors being selected, scaled or otherwise processed in any appropriate manner different from the examples described herein.

Figure 1:
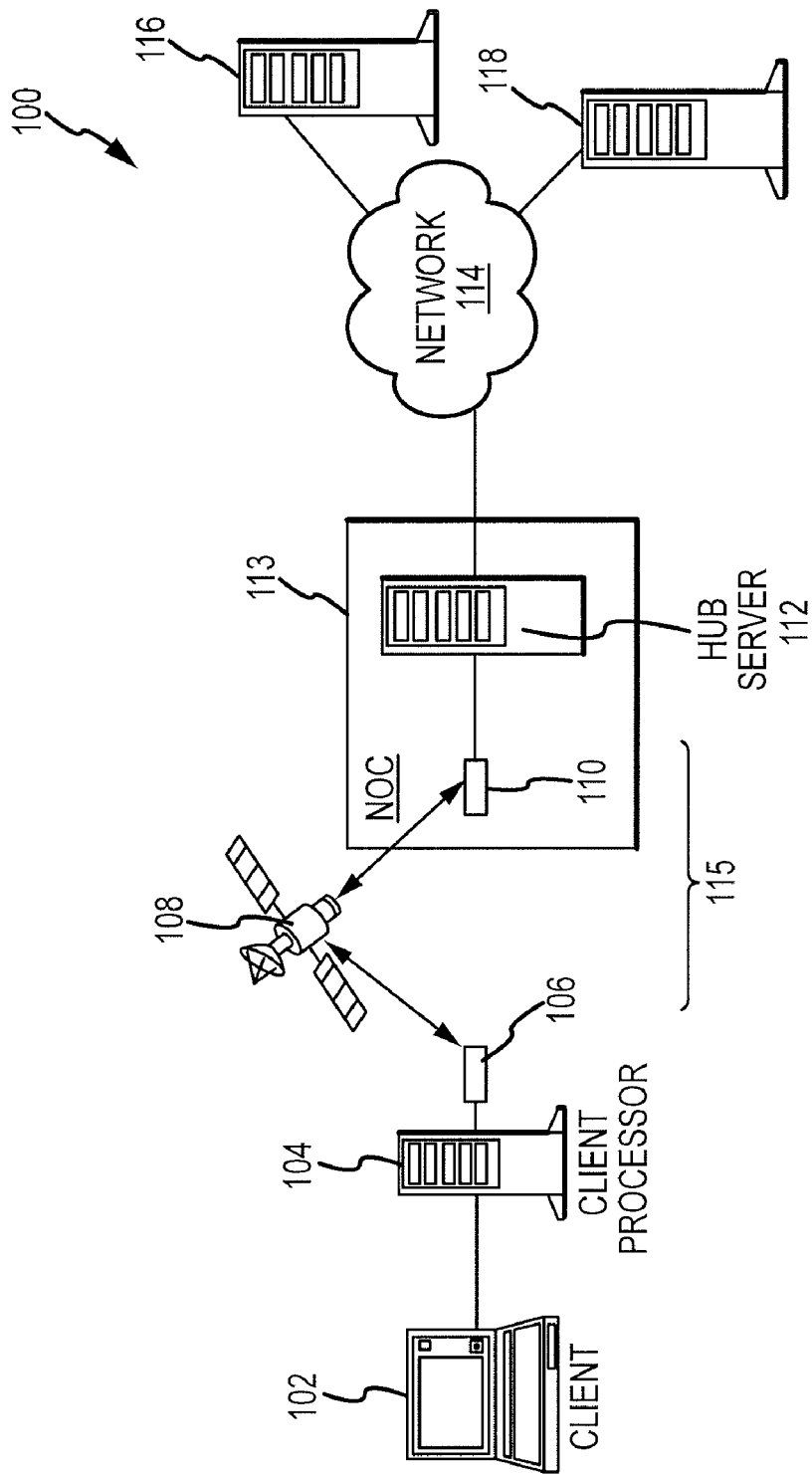

Turning now to the drawing figures and with initial reference to FIG. 1, an exemplary network communications system 100 suitably includes a user/client node 102 communicating via a link 115 with a remote host 116 on network 114. DNS information is obtained from a DNS server 118 operating on network 114 to facilitate communications between client 102 and server 116 as appropriate.

Client node 102 is any computer, personal digital assistant, telephone and/or other device capable of communicating with network 114 via link 115. Client node 102 may execute any conventional browser application or other software as appropriate to establish communications using an IP based protocol or the like. Multiple client nodes 102 may share a single network link 115; user nodes and network links need not be provided in one-to-one correspondence as shown in FIG. 1.

In various embodiments, client node 102 interacts with a client-side router, gateway or other processor 104 that guides communications between user node(s) 102 and link 115. In various embodiments, client processor 104 is a separate hardware device from host 102, although in other embodiments client processor may be implemented in software or firmware physically residing within host 102 or in any other location. Client-side processor 104 suitably interacts with a modem or other transceiver capable of linking to satellite 106 and/or otherwise providing communications across link 115.

Generally speaking, a satellite 108 or similar link 115 has sufficient capacity to process communications from multiple client processors 104. Each link 115 generally couples to network 114 at a network operations center (NOC) 113. NOC 113 includes any server 112 or cluster of servers 112 capable of supporting communications with the various client nodes 102 across link 115. NOC 113 typically includes any number of "hub" server nodes 112 that communicate over link 115 via any type of modem or other transceiver 110. NOC 113 may support links to multiple satellites 108 and/or other links 115, as appropriate.

Typically, client processor 104 and hub server 112 interoperate with each other to facilitate efficient communication across network link 115. In one satellite-based embodiment, for example, a request from client node 102 to connect with server 116 involves a request path from node 102 through client processor 104, to satellite 108 via transceiver 106, and to the NOS 113 via transceiver 110. Hub server 112 then provides the appropriate communication to server 116 through network 114. Response data from server 116 traverses network 114, server 112, transceiver 110, satellite 108, transceiver 106 and client processor 104 before reaching client node 102.

Figure 2:
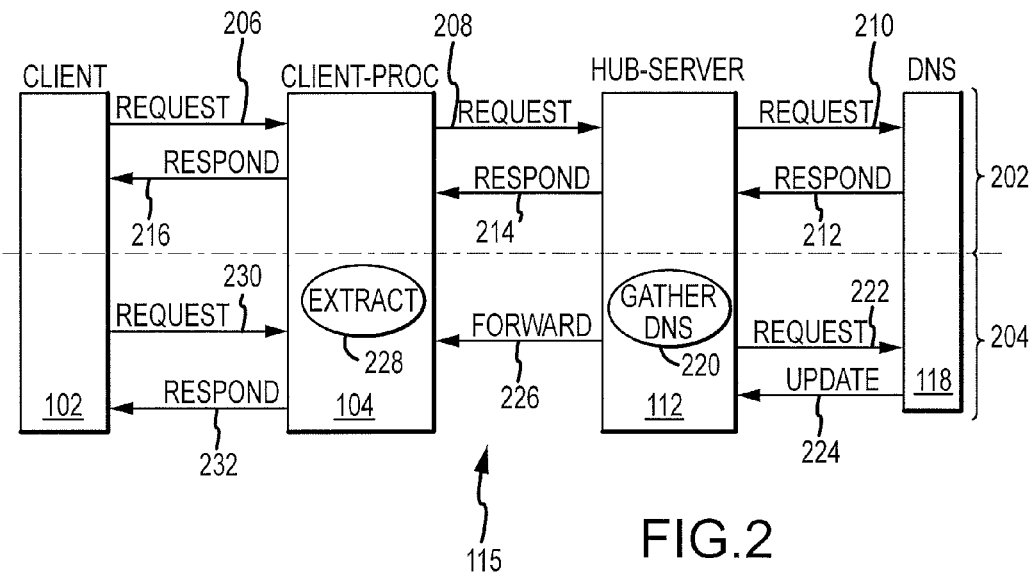
FIG. 2 is a data flow diagram showing exemplary processes for handling DNS queries across a communications link.

With primary reference now to FIG. 2, domain name services queries can be made more efficient by compiling a list of network address information associated with the sites queried by client node(s) 102. Using a conventional DNS query technique 202, client 102 formulates an appropriate DNS query packet 206 that is received at client processor 104. Client processor 104 forwards the request across link 115 as message 208, which is received at hub server 112 as appropriate. Hub server 112 then obtains the requested DNS information by placing a query 210 to an appropriate DNS server 118 on network 114, and receiving an appropriate response 212 containing the requested information. This information can then be forwarded across link 115 (response message 214), and ultimately delivered to the requesting node 102 as response 216.

In most embodiments, it is helpful to shield any non-standard formatting associated with link 115 from host 102 and/or any hosts 116, 118 on network 114. That is, it may be beneficial in many implementations for requests 206 and 210 to be placed in a standard DNS format, and for response messages 212 and 216 to be received in standard formats. Domain name services protocols used on common networks such as the Internet are generally made public and are very well defined, for example in Internet RFCs 1034 and 1035.

Communications between client processor 104 and hub server 112, however, may be readily enhanced in any manner that improves usage of link 115. In an exemplary process 204, DNS queries can be gathered (e.g. at DNS module 220) and collected in any manner to form a list of most popular (or otherwise statistically significant) hosts 116 on network 114. This list may be formed and maintained in any manner, as described more fully below. The created list 226 can then be forwarded across link 115 to client processor 104, which suitably extracts the list (e.g. in process 228) and uses the resulting information to provide subsequent responses 232 to future DNS queries 230 received from client node 102. By maintaining a copy of the list on the client side of link 115, the need to traverse link 115 for every DNS request 208 and response 214 can be avoided.

The list of statistically significant hosts 116 may be transmitted on any temporal basis. In various embodiments, the list is compressed and/or otherwise formatted for simultaneous (or near simultaneous) broadcast to multiple client processors 104 in communication with a particular satellite 108. The list may be sent when node 102 and/or processor 104 are powered on or otherwise initialized. The list may be sent in response to a request from client processor 104 and/or node 102. In various embodiments, the list is transmitted when either client processor 104 and/or hub server 112 identifies a period of relative inactivity in link 115 and/or node 102. In such embodiments, the list can be sent at a time that is relatively unnoticed by the user, further improving the user experience. Moreover, the list may be updated at regular or irregular intervals in any manner as appropriate.

Figure 3:
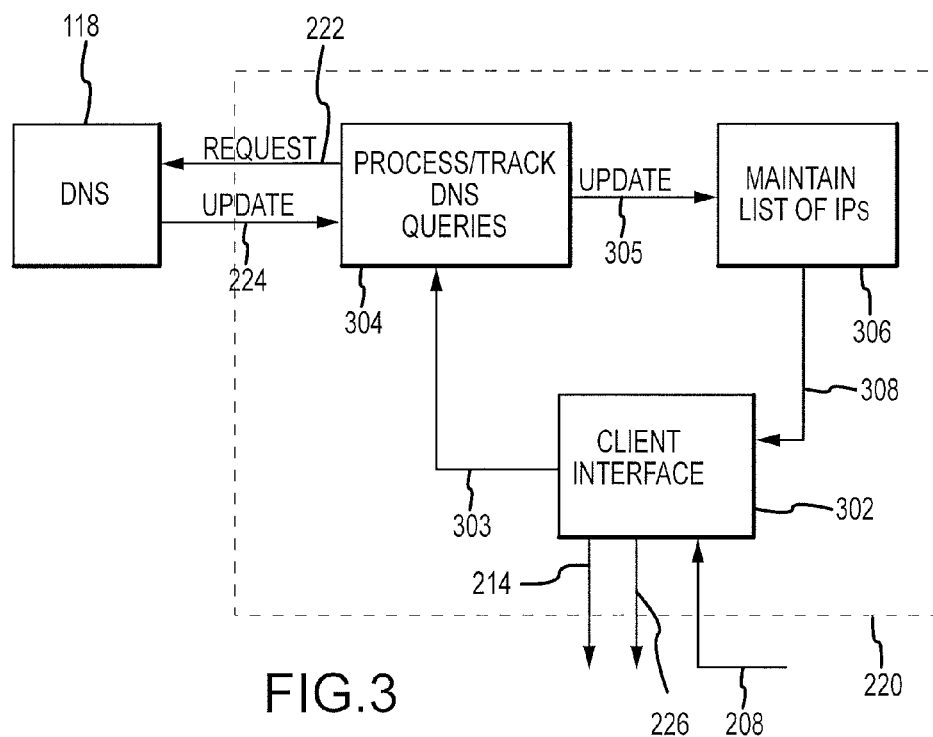
FIG. 3 is a block diagram of an exemplary system for processing DNS queries.

Turning now to FIG. 3, an exemplary system 220 for handling DNS queries from remote nodes 102 suitably includes a domain name services module 304, a database 306, and any sort of client interface 302. System 220 suitably resides on any sort of hub server 112 or other computing platform logically located at any centralized location (e.g. NOC 113) to permit data communications with multiple clients over network link 115.

Interface 302 is any sort of hardware, software, logical and/or other interface capable of handling communications with one or more client processors 104. In various embodiments, interface 302 provides an IP or other protocol interface as appropriate.

DNS module 304 is any hardware, software and/or other logic that interacts with a DNS server 118 providing a repository of hostname/address mappings for hosts on network 114. In various embodiments, DNS module 304 is itself configured as a DNS server 118; in other embodiments, module 304 communicates with a separate DNS server 118 on network 114 or elsewhere to obtain DNS information. In the later case, module 304 transmits request messages 222 on network 114 to obtain DNS information 224 in response to queries 303 received from interface 302.

As mentioned above, DNS information is maintained in a database or other list 306 of statistically significant hosts so that the list of most-commonly provided information can be forwarded to various client processors 104. List 306, then, includes any sort of database, data structure, data file or the like configured for storing address information for a statistically significant group of hosts on network 114, along with a hostname or other identifier for each host. The list 306 may be updated on any convenient basis. In various embodiments, list 306 is updated at regular or semi-regular time intervals (e.g. hourly, daily, etc.). In other embodiments, list 306 is updated as soon as DNS module 304 identifies any changes in address information for any of the hosts listed in list 306, or the like.

The hosts included within list 306 may be selected in any manner. The most popular hosts on network 114 as determined in any manner, for example, could make up a "statistically significant" group. In various embodiments, the hosts on network 114 that are most commonly queried for DNS information. The identification of the "most common queries" may be determined locally (e.g. by DNS module 304 or logic associated with list 306) based upon actual queries posited by one or more client nodes over any period of time. Alternatively, the "statistically significant" hosts may be ascertained from public or private data assembled with regard to network 114 (e.g. any list of most common network hosts as determined by search engine queries, advertising revenues, network carrier data and/or any other metrics as appropriate). In particular, it is not necessary that the "statistically significant" hosts be determined solely from local data, although some embodiments may operate in precisely this manner. Other factors that may be considered in determining which hosts are "statistically significant" could include such factors as relevance to prior queries, repetitive time based popularity, other related addresses to the authoritative domain addresses, and/or the like As noted above, the list 306 of statistically significant hosts may be forwarded (message 308) to the various client processors 104 in any manner. In various embodiments, list 306 is sent via client interface 302 at a time that is convenient with respect to link 115. List 306 may be sent as client processor 104 is starting up, for example, or at any time in which client node 102, client processor 104 and/or link 115 is relatively inactive. By providing a list of statistically significant hostnames at a time that is convenient to the user, the DNS process can be made more efficient for the end user. That is, the user at node 102 is able to locally process the statistically significant DNS queries without resorting to communications across link 115.

Figure 4:
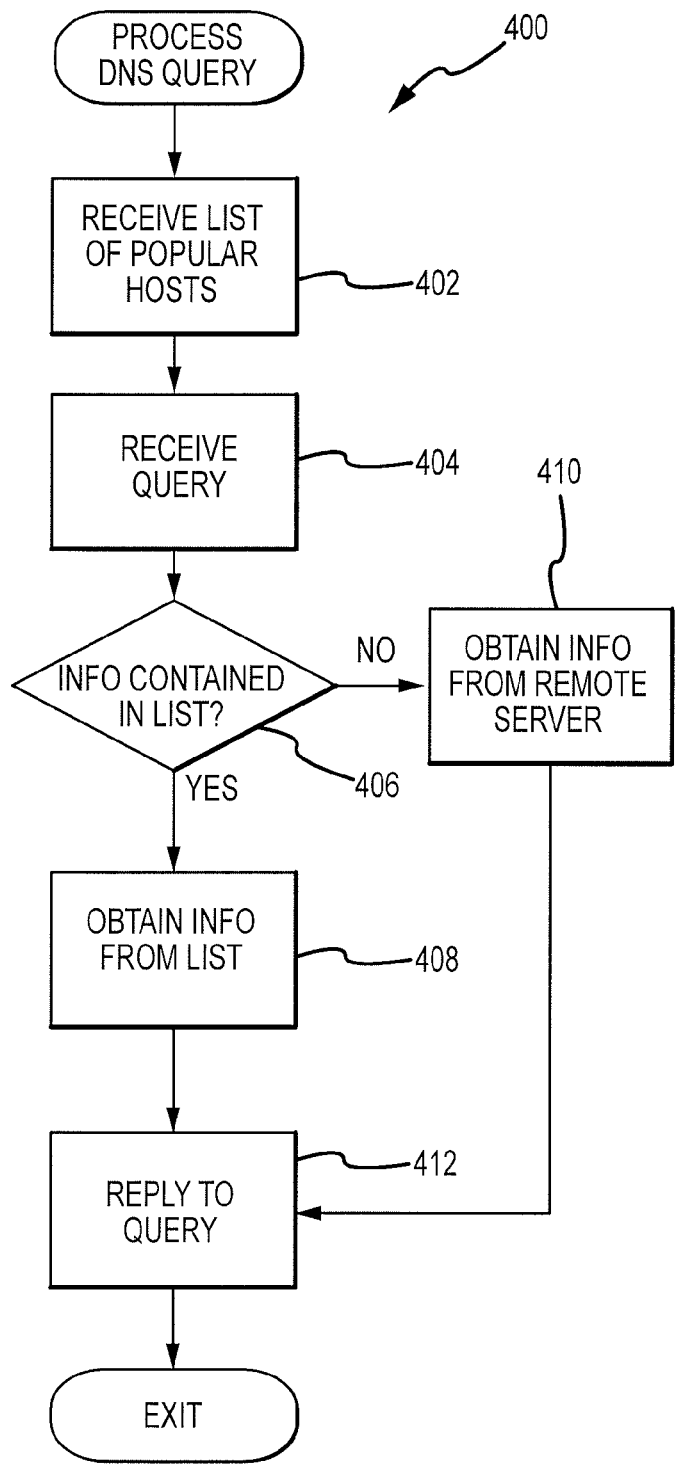
FIG. 4 is a flowchart showing an exemplary technique for processing a DNS query.

FIG. 4, for example, shows an exemplary process 400 that could be executed within a client processor 104 or other node that is on the same side of link 115 as the requesting client node 102. With reference to FIG. 4, the list is received at any convenient time (step 402). At any subsequent time, received queries (step 404) can be resolved by first determining if the queried information is contained within list 306 (step 406). If so, the information can be locally retrieved from the list (step 408) without resorting to communication across link 115. Otherwise, a DNS request 208 can be sent across link 115 (step 410), in accordance with process 202 described above. In either case, a reply message 216/232 (step 412) is sent to the requesting node, thereby allowing for subsequent operation on network 114 over link 115.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the functions and arrangements of the various elements described without departing from the scope of the invention.

What is claimed is:

1. A method of resolving a plurality of domain name services queries posited from a plurality of remote users across a satellite link to a network, wherein each query requests address information about a host on the network, the method comprising the steps of:

obtaining domain name services information for each of a plurality of hosts on the network, wherein each of the plurality of hosts is named in a list of statistically significant hosts on the network, wherein the list of statistically significant hosts is assembled from externally-obtained information;

determining when the satellite link is idle; and transmitting the list of statistically significant hosts and the domain name services information obtained for each of the hosts from the central node to each of the plurality of remote users across the satellite link when the satellite link is idle to thereby allow each of the plurality of remote users to locally store the domain name services information for each of the statistically significant hosts and to subsequently resolve subsequent domain name services queries for any of the plurality of statistically significant hosts locally without communicating across the satellite link.

2. The method of claim 1 further comprising updating the list of statistically significant hosts based upon further domain name services queries that are monitored by the central node.

3. The method of claim 2 wherein the updating is performed on a periodic basis.

4. The method of claim 1 wherein the transmitting step comprises transmitting the list of statistically significant hosts to one of the plurality of remote users when the one of the remote users is inactive.

5. The method of claim 1 wherein the transmitting step comprises transmitting the list of statistically significant hosts to one of the plurality of remote users when the one of the remote users executes a startup procedure.

6. The method of claim 1 wherein the externally-obtained information is obtained from a public or private source other than the plurality of remote users.

7. The method of claim 1 wherein the list of statistically significant hosts is determined based upon a popularity of the hosts on the network.

8. The method of claim 1 wherein the maintaining step comprises updating the address information for each of the hosts in the list of statistically significant hosts.

9. The method of claim 1 wherein the external information is determined by search engine queries.

10. The method of claim 1 wherein the external information is determined by advertising revenues.

11. The method of claim 1 wherein the external information is determined by network carrier data.

12. A method of handling a domain name services query for address information about an identified host residing across a satellite link to a network, the method comprising the steps of:
- receiving, via the satellite link, a list of address information for each of a plurality of statistically significant hosts on the network when the satellite link is otherwise idle;
- locally storing the address information for each of the statistically significant hosts;
- receiving the domain name services query for the address information about the identified host;
- determining if the address information about the identified host is contained within the list of statistically significant hosts;
- if the address information about the host is contained in the list of statistically significant hosts, locally resolving the domain name services query with the address information contained in the list of statistically significant hosts without forwarding the domain name services query across the satellite link, and otherwise forwarding the domain name services query across the satellite link.

13. The method of claim 12 further comprising determining when the satellite link is otherwise idle.

14. The method of claim 13 further comprising the step of receiving an updated list of statistically significant hosts via the satellite link when the satellite link is otherwise idle.

15. The method of claim 12 wherein the receiving step is performed prior to the receipt of the domain name services query.

16. A server configured to supply domain name services information about a plurality of hosts on a network to a plurality of remote users configured to access the network via a satellite link, the server comprising:
- a communications interface configured to communicate with the plurality of remote users; and
- a processor configured to assemble a list of statistically significant hosts on the network from external information about the network, to obtain domain name services information for each of the statistically-significant hosts identified by the external information, and to transmit the domain name services information to each of the plurality of remote users across the satellite link for local storage to thereby allow each of the remote users to locally resolve subsequent queries for domain name services information associated with any of the statistically-significant hosts without forwarding the query across the satellite link.

17. The server of claim 16 wherein the external information is obtained from an external source other than the queries supplied by the plurality of remote users.

18. The server of claim 16 wherein the external information about the network is determined by search engine queries.

19. The server of claim 16 wherein the external information about the network is determined by advertising revenues.

20. The server of claim 16 wherein the external information about the network is determined by network carrier data.

21. The server of claim 16 wherein the processor is configured to determine when the satellite link is idle and to transmit the domain name services information to the plurality of remote users when the satellite link is idle.

22. The server of claim 16 wherein the external information is obtained from a public source of information on the network.

23. The server of claim 16 wherein the external information is obtained from a private source of information on the network.

* * * * *

UNITED STATES PATENT AND TRADEMARK OFFICE
CERTIFICATE OF CORRECTION

PATENT NO. : 8,285,870 B2  
APPLICATION NO. : 11/850522  
DATED : October 9, 2012  
INVENTOR(S) : Thomas Steven Taylor et al.

Page 1 of 1

It is certified that error appears in the above-identified patent and that said Letters Patent is hereby corrected as shown below:

On the title page, item [75] should read John Yakemovic

Signed and Sealed this  
Eighteenth Day of June, 2013

Teresa Stanek Rea  
*Acting Director of the United States Patent and Trademark Office*